Nov. 11, 1969     M. R. CALTON ET AL     3,477,117
WELDING OF DISPERSION STRENGTHENED ALLOYS
Filed Oct. 17, 1967     4 Sheets-Sheet 2
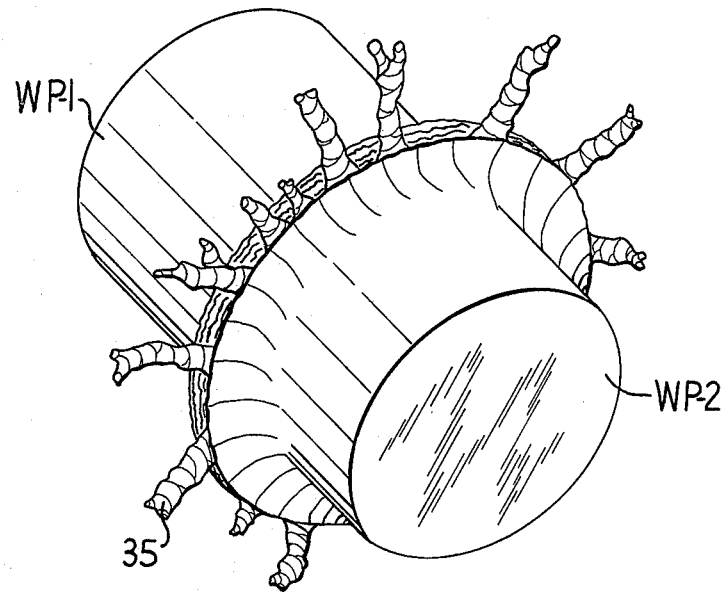
Fig.-2-
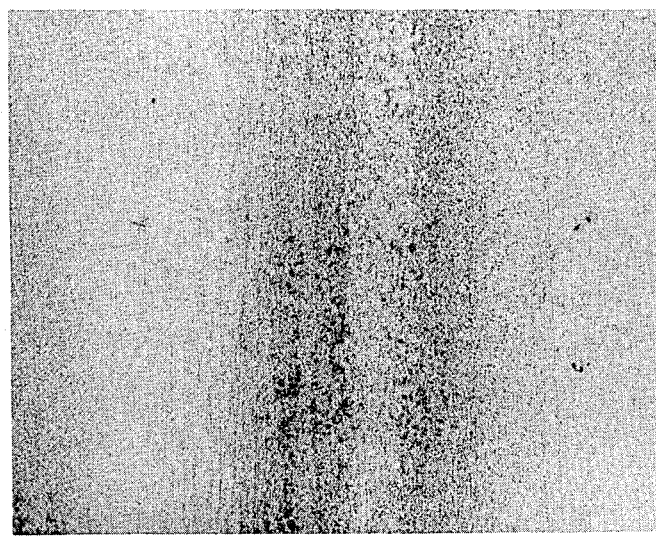
Fig.-4-
INVENTORS
MARION R. CALTON
THEODORE L. OBERLE
CARL D. WEISS Nov. 11, 1969 M. R. CALTON ET AL 3,477,117
WELDING OF DISPERSION STRENGTHENED ALLOYS
Filed Oct. 17, 1967 4 Sheets-Sheet 4
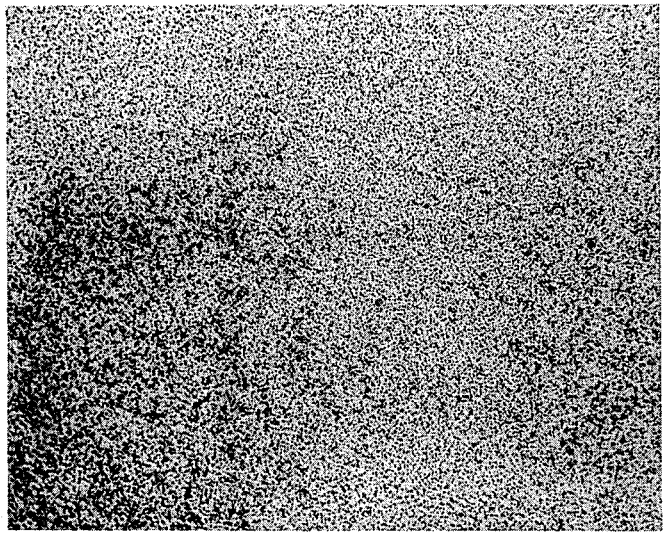
Fig_5_
INVENTORS
MARION R. CALTON
THEODORE L. OBERLE
CARL D. WEISS
BY
ATTORNEYS United States Patent Office 3,477,117
Patented Nov. 11, 1969

3,477,117
WELDING OF DISPERSION STRENGTHENED ALLOYS
Marion R. Calton, East Peoria, Theodore L. Oberle, Washington, and Carl D. Weiss, Peoria, Ill., assignors to Caterpillar Tractor Co., Peoria, Ill., a corporation of California
Filed Oct. 17, 1967, Ser. No. 675,873
Int. Cl. B23k 27/00
U.S. Cl. 29—470.3                                4 Claims

ABSTRACT OF THE DISCLOSURE

Welding dispersion strengthened alloys, such as TD Nickel (Thoria Dispersed) and S.A.P. (Sintered Aluminum Powder) to each other and to other metals by the friction welding process including parameters for the welding of these materials.

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature whereupon the relative rotation subsides.

It is also to be understood that the invention is specifically applicable to the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weight prior to engagement of the parts at the interface. The stored energy is discharged into the interface through frictional heating and plastic working developed at the interface as the rubbing contact slows the rotating weights and the bonding cycle is concluded.

Most dispersion strengthened alloys are relatively new materials which have been introduced to industry in recent years. These alloys generally have very good high temperature strength. This strengthening results from a uniform dispersion of small oxide particles in a matrix of the base metal. Two such materials are TD Nickel (Thoria Dispersed) and S.A.P. (Sintered Aluminum Powder). TD Nickel owes its high temperature strengthening qualities to a uniform dispersion of thorium oxide (ThO$_2$) and S.A.P. owes its high temperature qualities to a uniform dispersion of aluminum oxide (Al$_2$O$_3$).

TD Nickel was first introduced in 1962 and since that time it has been widely acclaimed as a possible material to bridge the gap between the super alloys and the refractory allows. Foil for honeycombs, tubing for heat exchangers, jet engine combustion chamber liners and turbine blades are examples of possible jet-age applications of thoriated nickel. The main advantages of TD Nickel are its oxidation resistance and high temperature strength. One of its main disadvantages is the problem it presents when it is joined by welding. Welding problems are attributed to agglomerations of the dispersed-oxide particles. Although TD Nickel can be welded by most conventional methods, the melting of the nickel matrix during welding results in an agglomeration and slagging off of the thoria dispersion with a consequent loss in high temperature strength.

S.A.P. is produced from pure aluminum by a patented process which involves the introduction of a controlled amount of aluminum oxide. In general, with this type of material, the physical properties of pure aluminum are largely maintained and mechanical properties such as tensile strength and creep resistance at elevated temperatures are improved to an extent which depends on oxide content. Full commercial exploitation of these properties, however, depends on the availability of suitable methods of joining components. S.A.P. presents a fusion welding problem similar to that discussed above with respect to TD Nickel; that is, an agglomeration of the dispersion particles with a resultant loss in high temperature strength. S.A.P. also has an undesirable tendency to crack when fusion welded.

In the past it has been very difficult to obtain good welds with these materials by the friction bonding process. In previous attempts to friction weld these materials, the materials tended to roll up and extrude outwardly from the interface of the parts being bonded in long twisted cylindrical projections.

It is the principal object of the present invention to provide parameters for the friction welding of these dispersion strengthened alloys wherein a good weld is produced and the uniform oxide dispersion of the materials is not destroyed.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is a perspective view illustrating a common problem which occurs when attempts are made to friction weld dispersion strengthened alloys;

FIG. 4 is a photomicrograph illustrating specimens of TD Nickel which have been bonded to each other by the method of the present invention; and FIG. 5 is a photomicrograph illustrating specimens of S.A.P. which have been bonded to each other by the method of the present invention.

DESCRIPTION OF THE PREFERRED EMBODIMENT

Figure 1:
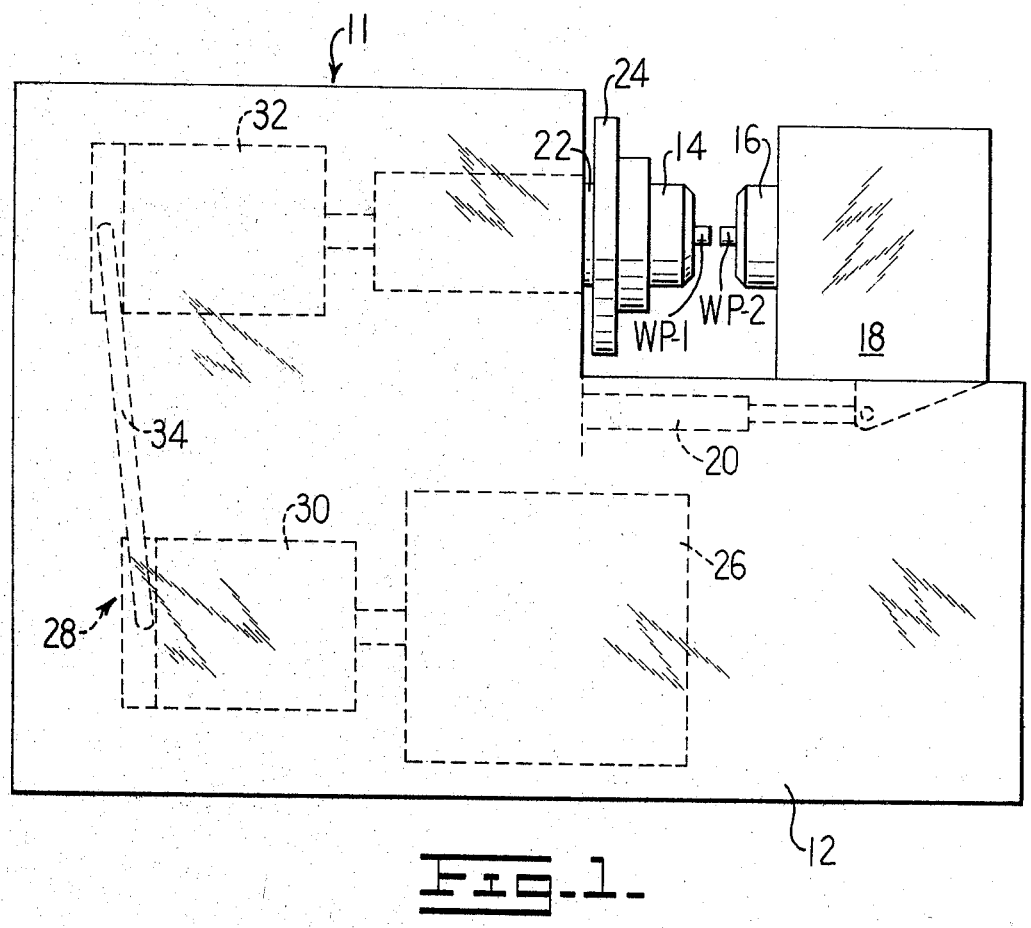
FIG. 1 is a side elevation illustrating one embodiment of a friction welding machine which may be used to practice the method of the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in United States Patent No. 3,273,233 and as described in further detail below.

A welding operation to join a first workpiece such as a dispersion strengthened alloy (i.e., TD Nickel or S.A.P.) to a second workpiece such as another dispersion strengthened alloy or other metal such as steel, for example, can be performed by operating the machine in the following general manner. One of the weld pieces WP-1 is firmly clamped in the rotatable chuck 14 located on the spindle 22. The other weld piece WP-2 is firmly clamped in the non-rotatable chuck 16 which is located on the tailstock portion 18 of the machine. Upon actuation of the motor 26, the flywheel and workpiece WP-1 are accelerated to a predetermined velocity.

Once the predetermined velocity has been obtained, the motor 26 is disconnected or shut down and the ram mechanism 20 is actuated to move tailstock portion 18 and workpiece WP-2 into contact with the rapidly rotating workpiece WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

From the work done involving many samples and various test programs, parameter ranges have been established for the friction welding of dispersion strengthened alloys, such as TD Nickel and S.A.P., to each other and to other metals. These various test programs revealed that while the parameter values for total input energy and axial pressure are important, it would appear that surface velocity or speed is the most important parameter since too low a speed will produce incomplete welding and extrusion of twisted projections from the interface and too high a speed will cause over-heating and subsequent agglomeration of the dispersion particles.

FIG. 2 is an illustration of one of the early attempts to friction weld TD Nickel to itself and aptly depicts the problem. It is theorized that when the surface velocity is below certain minimum values the material at the interface between workpieces WP-1 and WP-2 rolls up and extrudes from the interface in the form of long twisted cylindrical projections 35 which are sometimes referred to as "dingle-berries."

To illustrate the manner in which the friction welding process has been utilized to join TD Nickel and S.A.P. both to themselves and to other metals such as steel, and the manner in which the parameters involved in the instant invention were in part derived, the following examples are given. It is to be understood, however, that the examples are for the purposes of illustration and the invention is not to be regarded as limited to any of the specific materials or conditions recited therein.

Example 1

This example involved the friction welding of 0.750 inch diameter bar stock workpieces of TD Nickel to low carbon steel. Good welds were made with these materials using a surface velocity of approximately 1,370 surface feet per minute, an axial pressure of approximately 8,000 pounds per square inch, an energy input of approximately 40,500 foot-pounds per square inch and using a flywheel mass of 2.13 $WK^2$ (moment of inertia for rotating mass).

Figure 3:
FIG. 3 is a photomicrograph illustrating a specimen of TD Nickel which has been bonded to a specimen of carbon alloy steel by the method of the present invention.

FIG. 3 is a photomicrograph, taken at 500× magnification, of such a weld between TD Nickel and low carbon steel. This is considered to be a good weld and although not visible in these photographs, electron microscope study revealed that the uniform dispersion of the thoria particles has not been destroyed.

Example 2

This example involved the friction welding of TD Nickel to TD Nickel wherein the workpiece specimens were in the form of a tube of 0.5 inch outside diameter by 0.19 inch inside diameter. Good welds were made using the following approximate parameter values: surface velocity, 2,280 feet per minute; axial pressure, 7,150 pounds per square inch; energy input, 32,600 foot-pounds per square inch; and a flywheel mass of 0.105 $WK^2$.

FIG. 4 is a photomicrograph, taken at 100× magnification, wherein two specimens of TD Nickel have been friction welded to each other. Again, this is considered to be a very good weld wherein electron microscope studies reveal that the uniform dispersion of thoria particles has not been destroyed.

From the above examples and other tests which have been conducted it appears that a good weld can be made between TD Nickel and steel at somewhat lower surface velocities than are required to produce good welds between TD Nickel and TD Nickel.

Example 3

This example involved the friction welding to each other of S.A.P. bar specimens having a diameter of two and one-eighth inches. The weld was made using the following approximate parameter values: surface velocity 1,280 feet per minute; axial pressure, 11,250 pounds per square inch; energy input, 21,800 foot-pounds per square inch; and flywheel mass, 86 $WK^2$.

FIG. 5 is a photomicrograph, taken at 500× magnification, of the weld zone produced by friction welding under the above-stated conditions. Although a higher surface velocity would probably produce a weld with better appearance, this weld was good and metallographic examination showed that the uniform dispersion of alumina particles was not destroyed in the weld zone.

From the work done involving various samples and test programs, parameter ranges have been established for the friction welding of TD Nickel and S.A.P. both to each other and to other metals such, for example, as carbon alloy steel. These parameter ranges are:

TD Nickel

Surface Velocity—1,000 to 2,500 feet per minute.
Axial Pressure—6,000 to 25,000 pounds per square inch.
Input Energy—25,000 to 50,000 foot-pounds per square inch.

S.A.P.

Surface Velocity—1,000 feet per minute minimum.
Axial Pressure—4,000 to 15,000 pounds per square inch.
Input Energy—10,000 to 30,000 foot-pounds per square inch.

The parameter set forth above are the values which are considered necessary to produce acceptable or good welds when friction welding these materials. "Acceptable" in this sense means complete bonding of the entire interface between the workpieces, elimination of the extruded, twisted cylindrical projections from the interface, and preservation of the uniform oxide dispersion.

While all the parameter values set forth above are important for producing good welds with these materials, it would appear that speed is the most important parameter since too low a speed will result in incomplete bonding and produce the long twisted cylindrical projections at the interface, and too high a speed will cause overheating and subsequent agglomeration of the dispersion particles.

In welding dispersion strengthened alloys, the inertia welding process appears to have an advantage over conventional friction welding since the inertia process produces the required heat to forge and weld the material while at the same time keeping the weld cycle short in order to prevent overheating and agglomeration. This is probably due to the fact that while the heat is at a maximum, the speed is also decreasing very rapidly so that the weld area is subjected to the maximum temperature for an extremely short time (a weld time of 0.2 second is not uncommon). It has been theorized that the temperature required for welding, i.e., a temperature at or slightly above the elevated temperature strength of the material, is probably the same temperature at which agglomeration occurs. If this theory is correct, then it becomes apparent why the weld time should be made as short as possible.

We claim:

1. A method of friction welding TD Nickel workpieces to each other or to other metals comprising the steps of effecting relative rotation of the workpieces in a surface velocity range of from approximately 1,000 to 2,500 feet per minute, forcing the workpieces into frictional engagement at their common interface under a predetermined axially applied pressure of from approximately 6,000 to 25,000 pounds per square inch, and effecting an energy transfer at the interface in a range of from approximately 25,000 to 50,000 foot-pounds per square inch which concentrates heat at the interface until a bond is formed and all the input energy is expended in a time period short enough to prevent overheating and agglomeration of the dispersion particles.

2. A method as set forth in claim 1 wherein one of said workpieces is operatively associated with a rotating mass which mass stores the requisite amount of input energy to be released at the weld interface.

3. A method of friction welding S.A.P. workpieces containing particles of aluminum oxide to each other or to other metals comprising the steps of effecting relative rotation of the workpieces at speeds in excess of approximately 1,000 surface feet per minute, forcing the workpieces into frictional engagement at their common interface under a predetermined axially applied pressure of from approximately 4,000 to 15,000 pounds per square inch, and effecting a rate of energy transfer at the interface in a range of from approximately 10,000 to 30,000 foot-pounds per square inch which concentrates heat at the interface until a bond is formed and all the input energy is expended in a time period short enough to prevent overheating and agglomeration of the dispersion particles.

4. A method as set forth in claim 3 wherein one of said workpieces is operatively associated with a rotating mass which mass stores the requisite amount of input energy to be released at the weld interface.

References Cited
UNITED STATES PATENTS

| | | | |
|---|---|---|---|
| 2,946,119 | 7/1960 | Jones et al. | 29—470 |
| 3,247,591 | 4/1966 | Panseri | 29—497.5 |
| 3,273,233 | 9/1966 | Oberle et al. | 29—470.3 |
| 3,367,021 | 2/1968 | Beghi | 29—498 |

JOHN F. CAMPBELL, Primary Examiner

U.S. Cl. X.R.

29—498